US011159286B2

United States Patent
Hu et al.

(10) Patent No.: US 11,159,286 B2
(45) Date of Patent: Oct. 26, 2021

(54) PER-USER MIDAMBLE IN MU PPDU

(71) Applicant: MEDIATEK SINGAPORE PTE. LTD., Solaris (SG)

(72) Inventors: Shengquan Hu, San Jose, CA (US); Tianyu Wu, San Jose, CA (US); Jianhan Liu, San Jose, CA (US); Thomas Edward Pare, Jr., San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/406,931

(22) Filed: May 8, 2019

(65) Prior Publication Data
US 2019/0379500 A1 Dec. 12, 2019

Related U.S. Application Data

(60) Provisional application No. 62/681,153, filed on Jun. 6, 2018.

(51) Int. Cl.
*H04L 5/00* (2006.01)
*H04W 72/04* (2009.01)
*H04B 7/0452* (2017.01)

(52) U.S. Cl.
CPC ......... *H04L 5/0044* (2013.01); *H04B 7/0452* (2013.01); *H04L 5/0007* (2013.01); *H04W 72/0453* (2013.01)

(58) Field of Classification Search
CPC ... H04L 5/0007; H04L 5/0037; H04L 5/0044; H04L 5/0048; H04L 5/0094; H04L 1/0006; H04W 72/0453
See application file for complete search history.

(56) References Cited

U.S. PATENT DOCUMENTS

| | | | | |
|---|---|---|---|---|
| 2017/0134207 A1* | 5/2017 | Liu | ...................... | H04L 1/0026 |
| 2018/0145733 A1* | 5/2018 | Verma | .................. | H04L 5/0091 |
| 2019/0097857 A1* | 3/2019 | Zhang | ................. | H04L 27/2666 |
| 2019/0364525 A1* | 11/2019 | Yu | ........................ | H04L 27/2611 |
| 2020/0228634 A1* | 7/2020 | Noh | .................... | H04L 27/2613 |

OTHER PUBLICATIONS

IEEE P802.11 Wireless LANs Resolution for CIDs in 9.3.1.23 Date: Jan. 7, 2018, pp. 1-14.

* cited by examiner

*Primary Examiner* — Robert C Scheibel

(57) ABSTRACT

System and method of OFDMA transmission in which mid-ambles are configured on a per-user basis for channel variation adaptation. The multiple channels used in an OFDMA transmission may use different mid-amble settings based on their respective channel characteristics. Particularly, some channels may have mid-ambles and some may have not, and mid-amble update intervals may vary across the channels. For a trigger-based (TB) uplink (UL) OFDMA transmission, an AP may signal the per-user mid-amble information in the user information fields of the trigger frame. For a downlink (DL) OFDMA transmission, an AP may signal the per-user mid-amble information in the HE SIG-B fields.

20 Claims, 6 Drawing Sheets

PER-USER MIDAMBLE IN MU PPDU

CROSSREFERENCE TO RELATED APPLICATION

This patent application claims priority and benefit of U.S. Provisional Patent Application No. 62/681,153, entitled "PER-USER MIDAMBLE IN MU PPDU," filed on Jun. 6, 2018, the entire content of which is herein incorporated by reference for all purposes.

TECHNICAL FIELD

Embodiments of the present disclosure relate generally to the field of wireless network communication, and more specifically, to the field of communication protocols in Wi-Fi network communication.

BACKGROUND OF THE INVENTION

Wireless channels in a WLAN are often affected by the Doppler effect, for example caused by movements of associated wireless stations (STA) or fast-moving objects around the STAs. Some other changes in the environment may also cause the wireless channels to vary with time during transmission of a packet. If such channel variation is not taken into account in transmitting or receiving the packet, the performance in the WLAN system tends to be adversely affected.

An approach to combat the temporal channel variation issue involves inserting a "mid-amble" (or so-called "Doppler mid-amble") in the data field of a packet, the mid-amble including training symbols used by a receiving device to perform channel estimation and thereby keep track of the channel condition in real time. The mid-amble may be a repeat of a high efficiency—long training field (HE-LTF) included in the preamble. Typically, a mid-amble is inserted following a predefined data length (referred to as "mid-amble update interval" herein or as "mid-amble periodicity" in IEEE 802.11ax protocol), e.g., after each predefined transmission time or each predefined number of orthogonal frequency-division multiplexing (OFDM) symbols.

In Orthogonal frequency-division multiple access (OFDMA) transmission, a multi-user (MU) data packet includes payloads that are directed to multiple stations (STAs or "users" herein) and carried in different frequency channels (e.g., resource units (RUs)). Conventionally, the mid-amble setting for an OFDMA MU packet is uniform across the entire bandwidth. Particularly, the packet either has no mid-amble for any STAs, or has the same mid-amble update interval for all the STAs involved in the transmission. Typically, a mid-amble update interval is set to a higher value to ensure that each STA can receive the packet correctly.

However, in reality, it is unlikely that all the frequency channels in an OFDMA transmission vary together, let alone vary to the same extent. Unnecessary mid-ambles constitute a waste of transmission time that could have been used for data transmission. Therefore, using a common mid-amble update interval for all the channels tends to reduce the transmission efficiency and overall system throughput.

Generally, mid-ambles are not needed, nor supported, in DL Multi-User (MU) Multiple-Input Multiple-output (MIMO) transmissions. In an OFDMA transmission, if a frequency channel is allocated for a DL MU multiple-input Multiple-output (MIMO) mode, the entire bandwidth is prohibited from using mid-ambles due to the constraint of common mid-amble setting. This may cause incorrect channel estimation on other channels at the receiving STAs.

SUMMARY OF THE INVENTION

Accordingly, disclosed herein are embodiments directed to a mechanism of using mid-ambles to adapt to different channel variations in an Orthogonal frequency-division multiple access (OFDMA) transmission with improved transmission efficiency and throughput.

Embodiments of the present disclosure include using different mid-amble settings for the multiple frequency channels in an OFDMA transmission based on their respective channel characteristics, e.g., Doppler metrics. Particularly, a transmitting device (an access point (AP) or a non-AP STA) in an OFDMA transmission determines, on a per-user or per-channel basis, whether a channel is time-variant and whether mid-ambles are needed in the associated payload. If yes, a suitable mid-amble mode (e.g., mid-amble update interval) is selected such that receive device can take into account the channel variation when resolving. In this manner, the payloads carried in the multiple channels in an OFDMA transmission can have different mid-amble update interval modes, and some may not have any mid-amble. For a trigger-based (TB) uplink (UL) OFDMA transmission, an AP can individually indicate the existence and a selected update interval mode of mid-ambles for each STA in the trigger frame. In a downlink (DL) OFDMA transmission, the AP can decide the existence and a selected update interval mode for each STA separately, provided that the allocated frequency channel is not used in a DL MU MIMO mode.

Because mid-ambles are determined and inserted on a per-STA (or per-users) basis, selection of a mid-amble update interval mode can be tailored to the characteristics of a specific channel. As opposed to the conventional approach that only allows a common mid-amble setting, the per-user mid-amble approach can advantageously and effectively avoid unnecessary mid-ambles on non-time variant channels, and yet enables adaption for time-variant channels. As a result, transmission throughput and transmission efficiency can be advantageously improved. In addition, even if some frequency channel in an OFDMA transmission is used in an DL MU MIMO mode, mid-ambles can still be used on other OFDMA channels for channel variation adaptation.

Embodiments of the present disclosure further provide effective signaling mechanisms to enable the per-user mid-amble mode in an OFDMA transmission. To signal for a TB UL OFDMA transmission, an AP can indicate per-user mid-amble information in the user information fields of the trigger frame. For example, a reserved bit in a user specific information field can be used to indicate the existence of mid-amble(s) for the STA for the channel. A selected mid-amble update interval mode can be signaled by reusing a spatial stream allocation subfield ("SS Allocation") in the user information field, or using a reserved bit in a trigger-dependent user information field. The Doppler bit in the common field of the trigger frame can be used to indicate if at least one STA will use a mid-amble to send the TB MU packet.

In a DL OFDMA MU packet, per-user mid-amble information can be indicated in the high efficiency (HE) SIG-B user fields. For example, a per-user Doppler bit may be defined to indicate the existence of mid-amble(s) for the target STA. The field for indicating the number of spatial streams (e.g., "NSTS") may be redefined to also indicate a mid-amble update interval mode. The Doppler bit in the HE SIG-A field can be redefined to serve as a dual-use field for indicating two sets of information: (1) if the per-user mid-amble mode is used, the Doppler bit is used for at least one STA; (2) if the common mid-amble mode is used, the Doppler bit is used to indicate a common mid-amble setting for all the STAs associated with single user frequency channels. Redefining the fields advantageously expands the scope of information that can be provided to a receiving device by using the current preamble structure and yet without introducing a new dedicated field.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
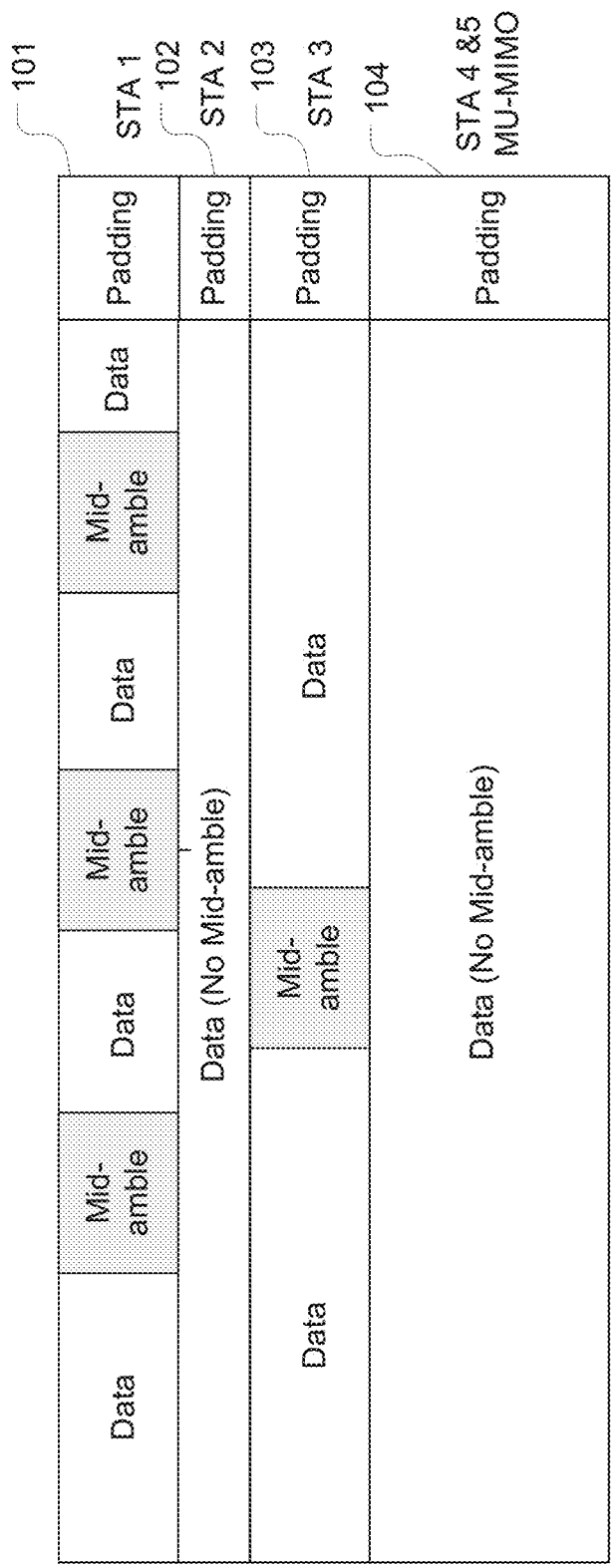
FIG. 1 illustrates exemplary per-user mid-amble usage in an OFDMA transmission in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Per-User Midamble in MU PPDU

Embodiments of the present disclosure are described in detail with reference to the Physical Layer Convergence Protocol (PLCP) protocol data unit (PPDU) structure as defined in the IEEE 802.11 family of Specifications and Standards. However, the present disclosure is not limited to any specific packet formats or structures, nor limited to any specific industry standards or specifications.

Embodiments of the present disclosure provide a mechanism of OFDMA transmission that uses mid-ambles on a per-user basis for channel variation adaptation. The multiple channels used in an OFDMA transmission may use different mid-amble settings based on their respective channel characteristics. Particularly, some channels may have mid-ambles and some may have not, and mid-amble update intervals may vary across the channels. For a trigger-based (TB) uplink (UL) OFDMA transmission, an AP may signal the per-user mid-amble information in the user information fields of the trigger frame. For a downlink (DL) OFDMA transmission, an AP may signal the per-user mid-amble information in the HE SIG-B fields.

FIG. 1 illustrates exemplary per-user mid-amble usage in an OFDMA transmission in accordance with an embodiment of the present disclosure. In this example, the entire bandwidth is divided into four frequency channels 101~104, each channel composed of one or more resource unit (RUs). Channels 101~103 are allocated to STA1, STA2 and STA3, respectively. Thus, these channels are used for transmission in a single-user (SU) mode during the OFDMA transmission. Channel 104 is allocated to STA4 and STA5 for transmission in a multi-user (MU) multiple-input Multiple-Output (MIMO) mode during the mixed OFDMA and MU-MIMO transmission.

According to embodiments of the present disclosure, for each individual channel, whether it needs mid-amble(s) is determined independently and on a per-user or per-channel basis, for example based on a set of Doppler metrics or other relevant channel characteristics. If it needs mid-ambles, a suitable mid-amble update interval mode is selected. Thus, in an OFDMA transmission, the payloads carried in the multiple channels can have different mid-amble update interval modes, and some may not have any mid-amble.

As illustrated, the channels 101 and 103 have mid-ambles inserted between the data symbols ("Data") for STA1 and STA3, but have different mid-amble update intervals. Different mid-amble update intervals are used, e.g., because the channels are experiencing different levels of channel variation in time as detected. Channel 102 has no mid-amble, for example because it is determined that the channel is non-time-variant for the OFDMA transmission. Channel 104 has no mid-ambles because it is used in an DL MU MIMO mode.

Because mid-ambles are utilized on a per-STA (or per-users) or per-channel basis, selection of a mid-amble mode can be tailored to the characteristics of a specific channel. As opposed to the conventional approach that only allow a common mid-amble setting, per-user mid-amble usage can advantageously and effectively avoid unnecessary mid-ambles and yet enables necessary channel variation adaption in the transmission. As a result, transmission throughput and efficiency can be advantageously improved. In addition, in an OFDMA transmission, even if some frequency channel is used in a DL MU MIMO mode which does not support mid-amble usage, mid-ambles are still allowed on other channels.

Figure 2:
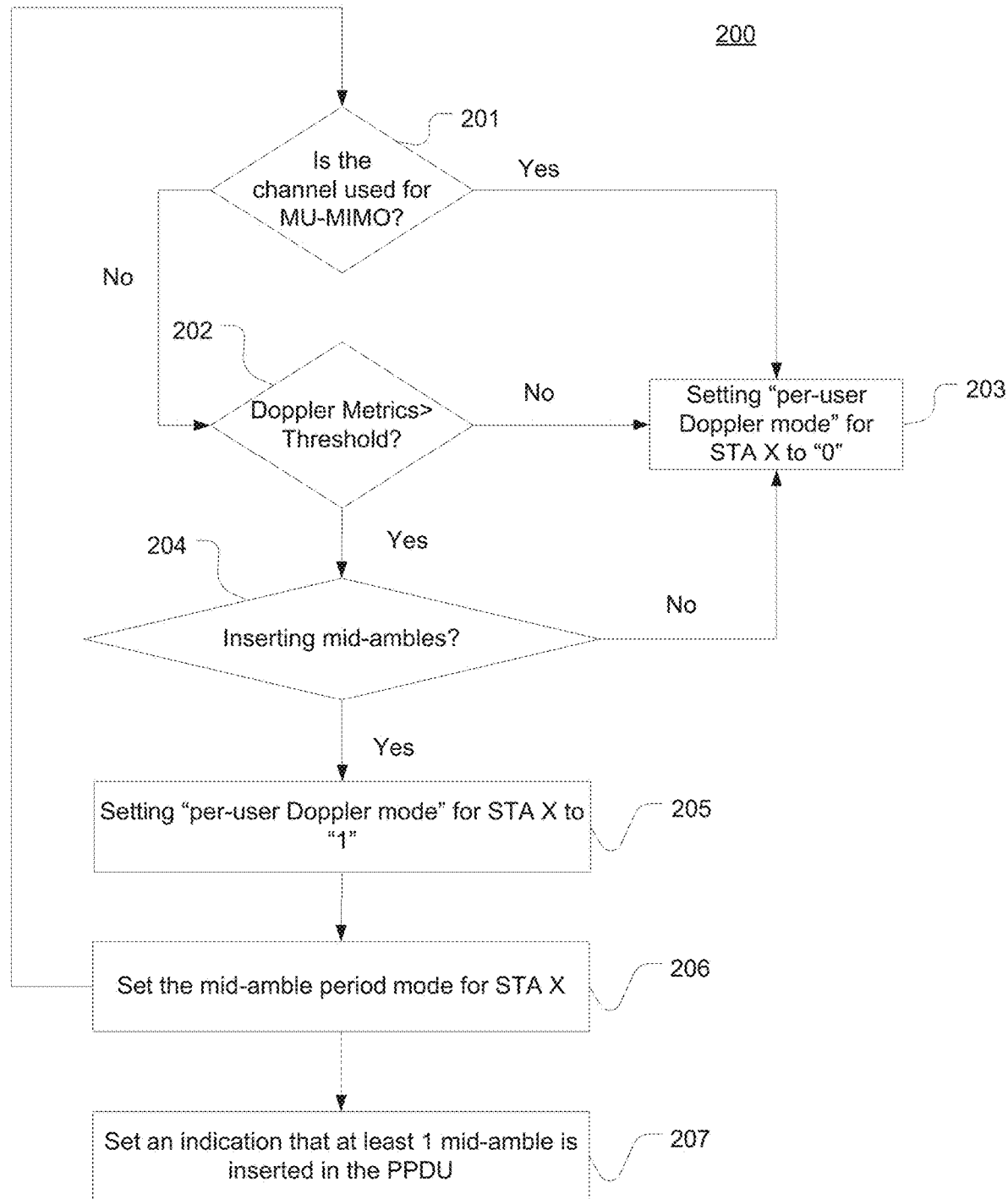
FIG. 2 is a flow chart depicting an exemplary process of setting indications related to per-user mid-amble usage for an OFDMA transmission in accordance with an embodiment of the present disclosure.

FIG. 2 is a flow chart depicting an exemplary computer implemented process 200 of setting indications related to per-user mid-amble usage for an OFDMA transmission in accordance with an embodiment of the present disclosure. Process 200 may be performed by an AP, following allocation of frequency channels to the multiple STAs, when generating a trigger frame to trigger an UL OFDMA transmission, or when generating a PPDU for a DL OFDMA transmission. STA X and the corresponding channel are used as an example in the flow chart. It will be appreciated that process 201~206 is repeated for each STA or each allocated channel involved in the OFDMA transmission.

At 201, it is determined whether the channel is used in a DL MU MIMO mode. If yes, no mid-amble should be added in this channel for DL MU-MIMO. Accordingly, at 203, the "per-user Doppler mode" for STA X is set to "0." If no, at 202, it is determined whether Doppler metrics of this channel is greater than a predefined threshold. If no, the "per-user Doppler mode" for STA X is set to "0," meaning there is no mid-amble in this channel.

The present disclosure is not limited to any specific Doppler metric or any other type of metrics that can be used to indicate a channel variation status. The metric may integrate one or more channel characterization parameters. For example, the Doppler metric can result from channel estimation performed on the OFDM symbols and fixed positioned pilots in a packet that was previously received by the transmitting device. In some embodiments, the Doppler metric is defined as a normalized difference of channel estimations between a number of OFDM symbols. In some other embodiments, the Doppler metric is defined as the energy difference of the constant modulus modulated subcarriers, such as binary shifting key (BPSK) modulated fixed positioned pilots. Various exemplary Doppler metric definitions and processes of determining the metrics are described in greater detail in the commonly-owned, co-pending U.S. patent application Ser. No. 15/342,299, entitled "SIGNALING AND FEEDBACK SCHEMES OF TIME-VARYING CHANNELS IN HIGH-EFFICIENCY WLAN," the content of which is incorporated herein by reference for all purposes.

In this example, if the Doppler metrics indicate that the channel is time variant, it is further determined (at 204) whether to insert mid-amble for the STA X. It will be appreciated that this determination process is specific to STA X and independent of another STA. The decision may be based on any suitable factors, such as the length of the data packet. If no mid-amble is to be inserted, the "Doppler mode" for the STA X is set to "0." Otherwise, it is set to "1." At 206, the mid-amble update interval mode for the STA X is selected and an indication is set accordingly. At 207, an indication is set to indicate whether at least one mid-amble is used in the OFDMA transmission.

It is necessary to inform the receiving devices of the presence and the update interval of mid-ambles. Conventionally, a packet preamble has a dedicated field for indication of existence of mid-ambles in the packet. For example, as in the IEEE 802.11ax family of Standard and Specifications, a one-bit "Doppler mode" field in the preamble HE-SIG A field is defined to indicate whether any Doppler mode mid-amble is included in the packet. The single bit is inadequate for per-user mid-amble usage. Unfortunately, constrained by the existent PPDU structures with all the preamble bits already used or reserved for specific indications, it is difficult to introduce any additional field for reporting the channel condition in a shorter packet.

Figure 3:
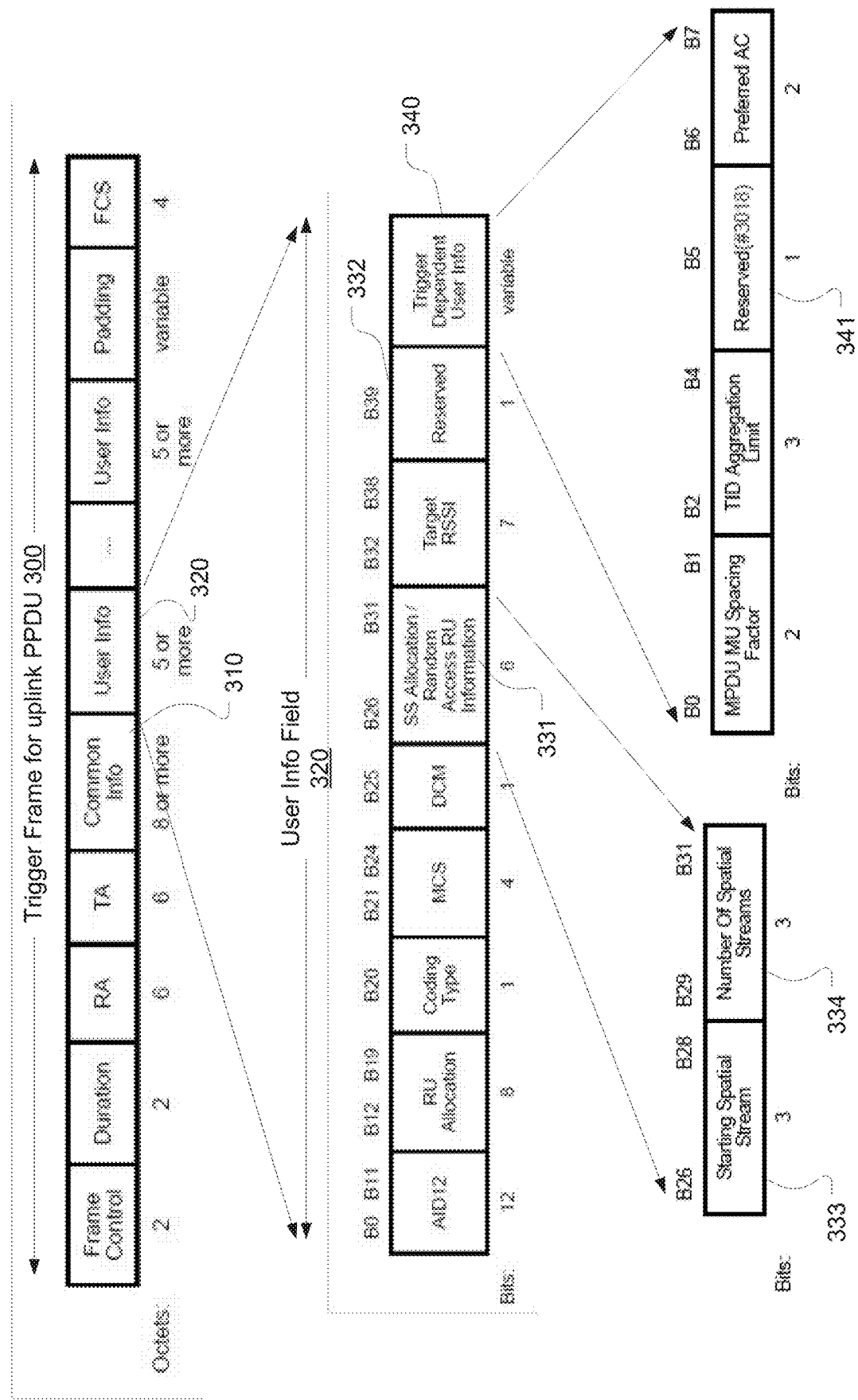
FIG. 3 illustrates the format of an exemplary trigger frame for triggering a TB PPDU transmission in OFDMA and the frame includes indications of per-user mid-amble usage in accordance with an embodiment of the present disclosure.

FIG. 3 illustrates the format of an exemplary trigger frame 200 for triggering a TB PPDU transmission in OFDMA and the frame 300 includes indications of per-user mid-amble usage in accordance with an embodiment of the present disclosure. As shown, the trigger frame 300 includes a frame control field (e.g., "Frame Control"), a transmission duration field ("Duration"), receiver address and transport address fields ("RA" and "TA"), a common information field ("Common Info") 310 and one or more user information field ("User info," e.g., 320), a padding ("Padding") and a frequency check sequence ("FCS").

The common information field 310 has a subfield "Doppler bit" (not explicitly shown). In some embodiments, this bit is set to "1" if at least one STA will use the Doppler mode in the following TB PPDU transmission, meaning the PPDU is to include at least one mid-amble; otherwise, it is set to "0."

Further, the trigger frame indicates the existence and the update interval modes of mid-ambles for individual STAs in user information fields (e.g., 320). Each user information field may specify the IDs of one or more STAs to be triggered (e.g., "AID12"), allocated RUs ("RU Allocation"), allocated spatial streams ("SS Allocation Random Access RU Information") 331, a reserved bit ("Reserved") 332 as well as other information needed for the UL PPDU transmission, such as coding type, modulation and coding scheme ("MCS"), dual carrier modulation ("DCM"), target received signal strength indicator ("Target RSSI"), and trigger dependent user information 340.

In some embodiments, the reserved bit 332 may be used to indicate the existence of mid-amble(s) for the corresponding STA. For example, setting this bit to "1" to signal the STA to insert mid-amble(s) in the following TB PPDU; setting to "0" to signal otherwise.

In some embodiments, the "SS Allocation Random Access RU Information" 331 may be redefined to indicate a mid-amble update interval mode selected for the STA. When the reserved bit 332 is set to "1," the STA will be the only one allocated to this channel, so the "Starting Spatial Stream" 333 subfield is not needed as it always starts from 1. The maximum number of spatial stream for the STA will also be limited to a small number, e.g. 4, and so the "Number of Spatial Streams" 334 subfield may not need 3 bits for this purpose. Thus, some of the bits in the "SS Allocation" field 331 can be redefined to indicate a mid-amble update interval selected for the STA, e.g., every 10 symbols or every 20 symbols.

In some other embodiments, a reserved bit 341 in the trigger dependent user information subfield 340 may be used to indicate a mid-amble update interval mode selected for the STA. It will be appreciated that other suitable bits in the user information field may be used or reused to a per-user mid-amble interval mode without departing from the scope of the present disclosure.

Figure 4A:
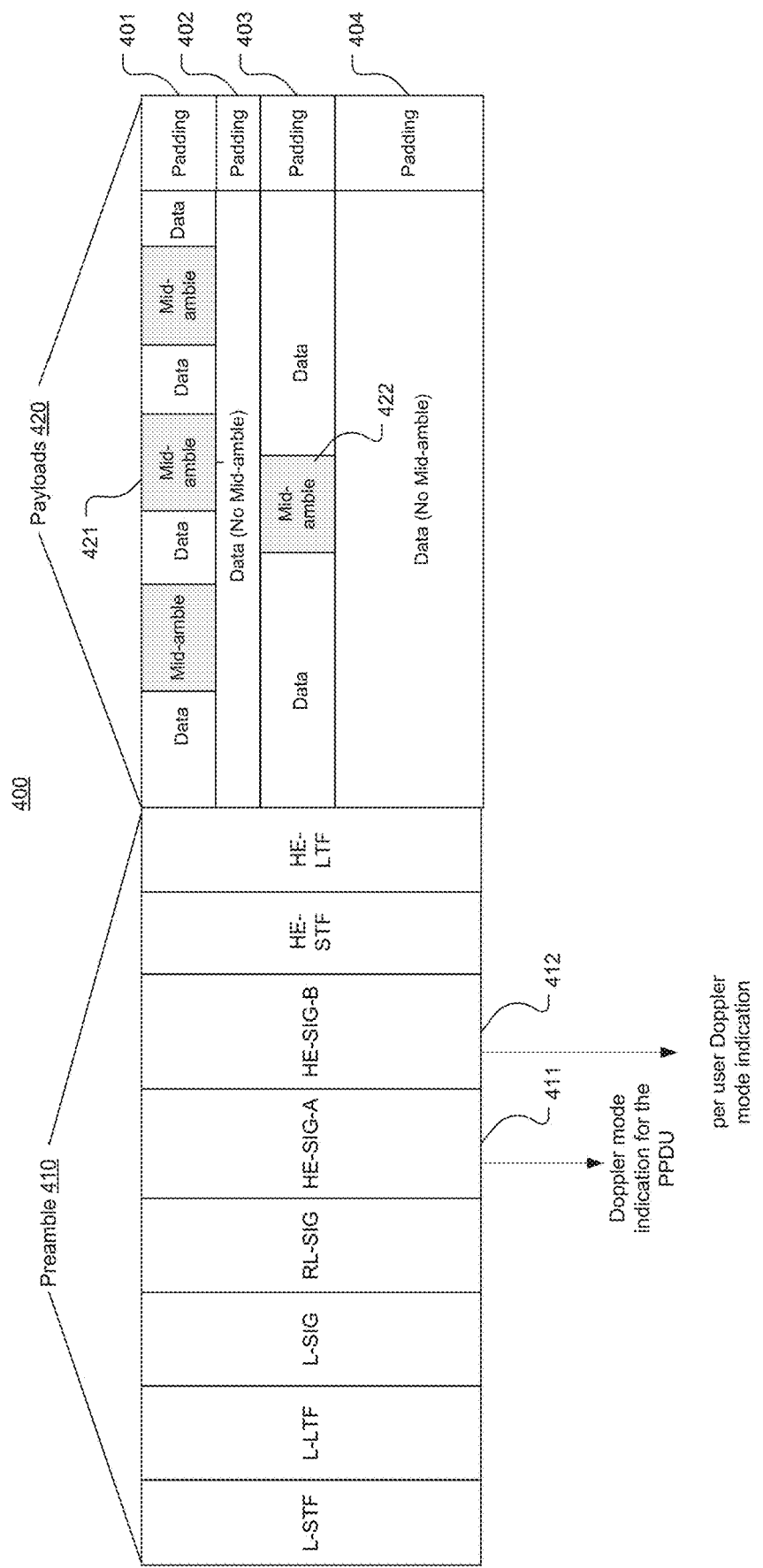
FIG. 4A illustrates the format of an exemplary downlink (DL) HE MU PPDU for an OFDMA transmission operable to signal per-user mid-amble usage in accordance with an embodiment of the present disclosure.

FIG. 4A illustrates the format of an exemplary downlink (DL) HE MU PPDU 400 for an OFDMA transmission operable to signal per-user mid-amble usage in accordance with an embodiment of the present disclosure. The PPDU 400 includes a preamble 410 and payloads 420 encoded and modulated in different channels 401~404. The payloads 420 are directed to STA1~STA5 in the same manner as the example shown FIG. 1. The channels 401~404 may be contiguous or non-contiguous RUs and may have varying sizes. The preamble 410 includes the short and long training fields ("L-STF," "L-LTF," "HE-STF," and "HE-LTF") and the signaling fields ("L-SIG," "RL-SIG," "HE-SIG-A," "HE-SIG-B").

The mid-ambles (e.g., 421 and 422) carry training symbols to be used by a receiving STA to perform channel estimation and thereby to keep track of the channel condition in real time. Each mid-amble may be a repeat of one or multiple "HE-LTF" fields in the preamble. However, the present disclosure is not limited to specific information contained in mid-ambles.

According to embodiments of the present disclosure, the "HE-SIG-A" field 411 can carry an indication regarding the overall mid-amble usage in the entire PPDU, and the "HE-SIG-B" field can carry indications regarding the per-user mid-amble usage.

The "HE-SIG-A" 411 includes a one-bit subfield (or "field") "Doppler mode." Conventionally, this bit is used to indicate whether Doppler mode mid-ambles are contained in the payloads. As noted above, the single bit suffices to indicate the mid-amble usage for the entire PPDU since all the channels use the same mid-amble setting.

According to embodiments of the present disclosure, the "Doppler mode" field in the "HE-SIG-A" 411 is redefined to carry two alternative sets of information depending on whether per-user Doppler mode is used. Particularly, if the per-user Doppler mode is signaled in the "HE-SIG-B" user fields, the "Doppler mode" field in "FIE-SIG-A" 411 can be set to "1" to indicate that the Doppler mode is used for at least one STA, and set to "0" to indicate that the Doppler mode is not used. On the other hand, if the per-user Doppler mode is not signaled in the "HE-SIG-B" user fields, the "Doppler mode" field in "I-IE-SIG-A" 411 can be set to "1" to indicate that the Doppler mode is used for all the STAs (e.g., with a common mid-amble update interval mode) allocated on single-user channels and set to set to "0" to indicate that the Doppler mode is not used for any STA.

Therefore, the "Doppler mode" field in a PPDU is redefined to serve as a dual-use field for indicating two sets of information. This advantageously expands the scope of information that can be provided to a receiving device by using the current preamble structure and without requiring introducing a new dedicated field.

Figure 4B:
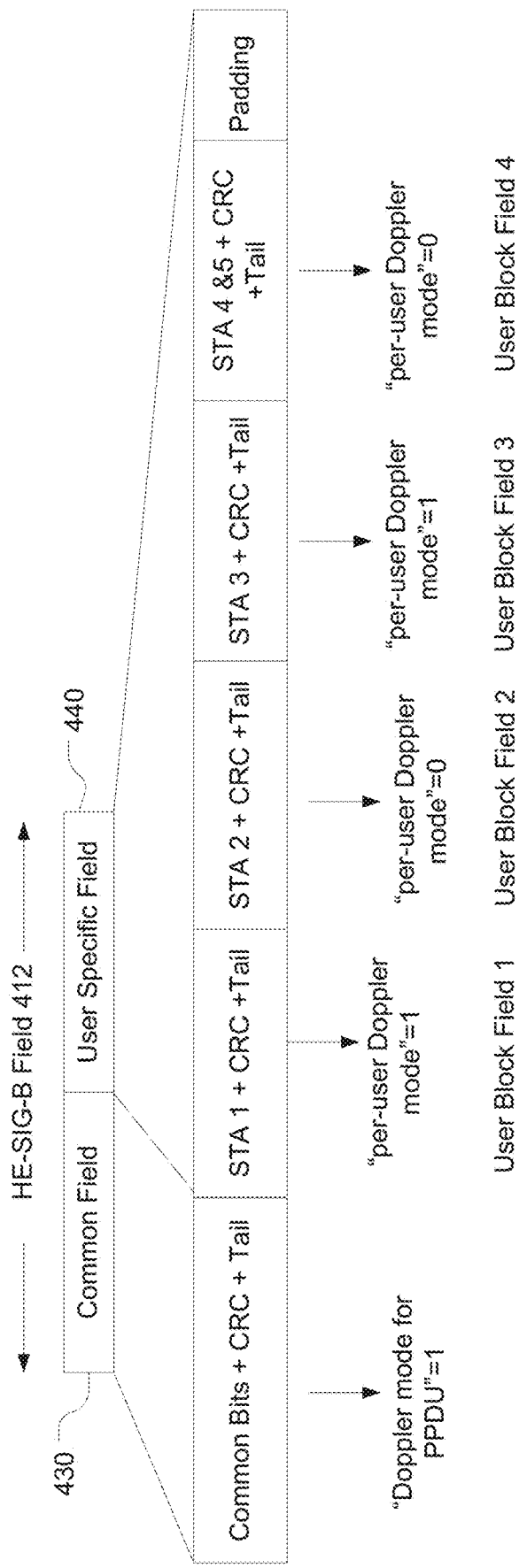
FIG. 4B illustrates the format of the "HE-SIG-B" field in the exemplary DL PPDU 400 in which per-user mid-amble information is signaled in the user specific fields in accordance with an embodiment of the present disclosure.

FIG. 4B illustrates the format of the "HE-SIG-B" field 412 in the exemplary DL PPDU 400 in which per-user mid-amble information is signaled in the user specific fields in accordance with an embodiment of the present disclosure. The "HE-SIG-B" field 412 includes a "Common Field" 430 and a "User Specific Field" 440. As noted above, the "Doppler field" in the "Common Field" is set to 1 since there are mid-ambles used in the PPDU.

The "User Specific Field" 440 includes one or more "User Block Fields 1-5" which may be followed by padding 174. Each "User Block Field" includes two user fields designed to contain information for up to two STAs to decode their payloads, a cyclic redundancy check (CRC) sequence and a trail. Each user field may include a "STA-ID" field, the value of which represents the identification of the one or two STAs. Each user field may include fields for additional information related to the STAs, such as, RU allocation, number of spatial streams (e.g., "NSTS"), use of transmit beamforming (e.g., "TX Beam-forming"), modulation and coding scheme (e.g., "MCS"), dual carrier modulation (e.g., "DCM") and coding mechanism (e.g., "Coding").

According to embodiments of the present disclosure, each user block field contains a subfield for per-user mid-amble signaling. For example, this subfield has one bit, where "1" indicates existence of at least one mid-amble for the corresponding STA, and "0" indicates none mid-amble. As illustrated, the per-user Doppler mode bit is "1" for STA1 and STA3, and "0" for STA2, STA4 and STA5.

According to the IEEE 801.11ax family Standards and Specification, there is no reserved bit in "HE SIG-B" field. Therefore, a new bit may be introduced to each user block field as a per-user Doppler mode bit. To keep the size of the user block field for a non-MU-MIMO allocation the same as one for an MU-MIMO allocation, a reserved bit may also be added to the user block field for an MU-MIMO allocation.

For a specific STA, a bit used for indicating a number of spatial streams ("NSTS") allocated for the STA can be redefined to also indicate the selected mid-amble update interval mode. This is because, if its per-user Doppler bit is set to "1," the maximum number of spatial streams will be a relatively small number e.g., up to 4 and 2 bits in the "NSTS" field can be used for adequate indication. Thus, the remaining 1 bit can be reused to indicate the mid-amble mode, e.g., every 10 symbols or every 20 symbols.

Figure 5:
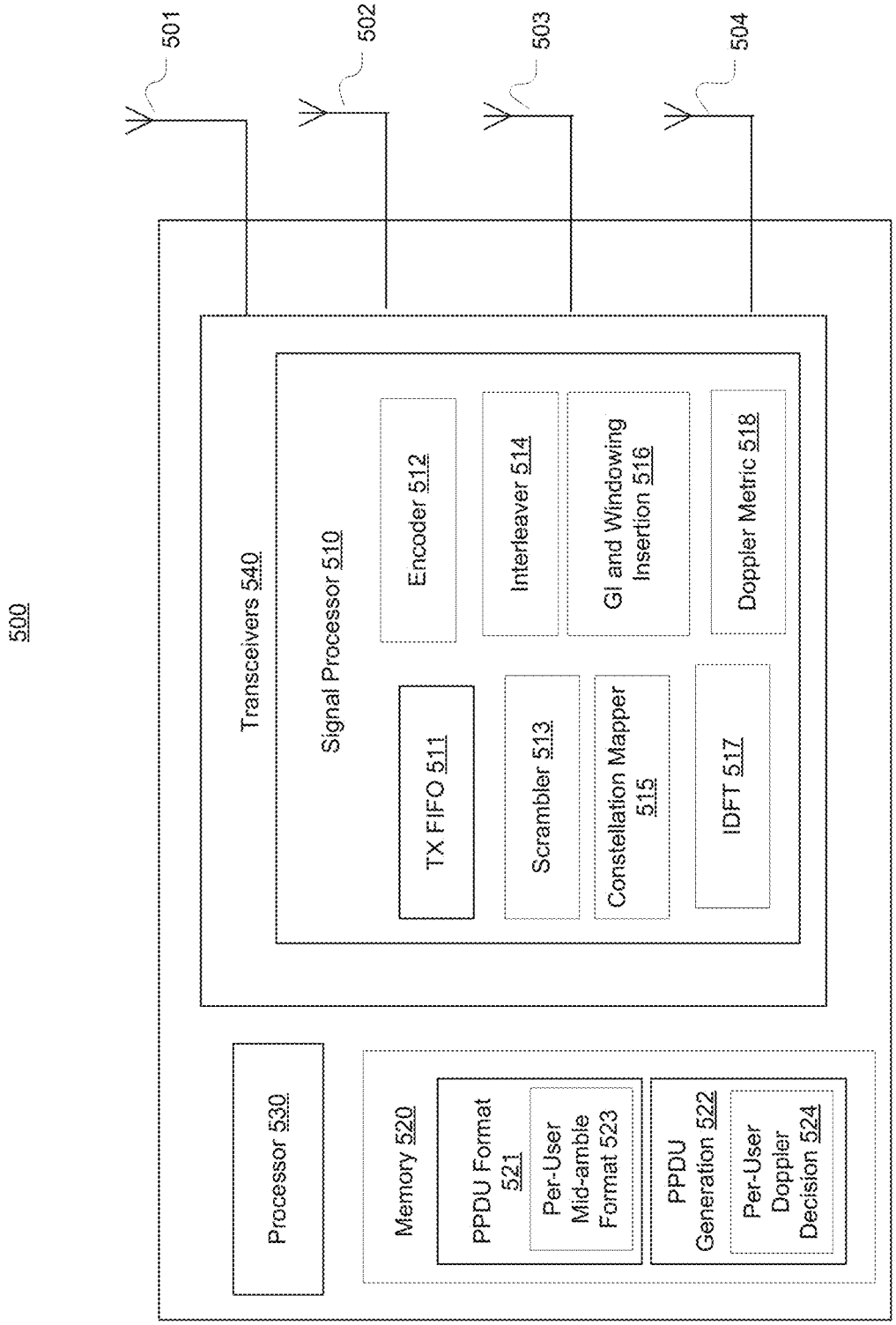
FIG. 5 is a block diagram illustrating the configuration of an exemplary wireless communication device operable to generate a trigger frame or generation a DL PPDU for an OFDMA transmission with per-user mid-ambles and indications thereof according to an embodiment of the present disclosure.

FIG. 5 is a block diagram illustrating the configuration of an exemplary wireless communication device 500 operable to generate a trigger frame or generation a DL PPDU for an OFDMA transmission with per-user mid-ambles and indications thereof according to an embodiment of the present disclosure. The device 500 may be a wireless device configured as an AP station. The device 500 is configured to generate a trigger frame or a DL PPDU and assign values to several fields related to per-user Doppler mode or per-user mid-amble usage as described in greater detail with reference to the process of FIGS. 1-4B.

Device 500 may be a router, a general-purpose computer, or any other type of computing device with a network device. The device 500 including a main processor 530, a memory 520 and a transceiver 540 coupled to an array of antenna 401-404. The transceiver 540 includes a signal processor 410 having various modules of the transmit path which is configured to generate each section of a PPDU, a trigger frame, or any other type of communication transmission messages. For instance, the signal processor 540 includes a transmit First-In-First-Out (TX FIFO) 511, an encoder 512, a scrambler 513, an interleaver 514, a constellation mapper 515, an inversed discrete Fourier transformer (IDFT) 517, and a guard interval (GI) and windowing insertion module 516. The signal processor 540 also includes a Doppler metric module 518 configured to calculate a Doppler metric associated with an individual channel and compare it with a threshold value to determine whether it is time-variant.

The memory 530 stores the PPDU format 521 including the redefined dual-use fields, such as "Doppler mode" in "HE-SIG-A", "SS Allocation" in user information fields in trigger frames, reserved bits, and per-user Doppler bit in "HE-SIG-B," etc, as described in greater detail with reference to FIGS. 1-4B. The PPDU generation module 522 stores processor-executable instructions for generating data as well as configurations of other parts of PPDUs according to the PPDU format 521. The PPDU generation module 522 includes a per-user Doppler decision module 524 which may decide whether to enable per-user Doppler mode for the PPDU transmission, whether an individual channel is time-variant and whether to insert a mid-amble for the corresponding STA, and what mid-amble update interval is to be used for the STA, as described in greater detail with reference to FIGS. 1-4B. The signal processor 510 generates the preamble and the mid-amble accordingly.

It will be appreciated that each of the signal processor 510 may include a wide range of other suitable components that are well known in the art. The various components can be implemented in any suitable manner that is well known in the art and can be implemented using hardware logic, firmware logic, software logic or a combination thereof. Further, in some embodiments, the transceiver 540 in FIG. 5 may as well include the components in a receive path.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising:
  at an access point, allocating a first set of frequency channels respectively to a first plurality of stations (STAs) for a downlink (DL) multi-user (MU) Orthogonal Frequency-Division Multiple Access (OFDMA) transmission;
  generating an MU packet comprising a plurality of payloads to be transmitted respectively in said first set of frequency channels, wherein said generating comprises:
    inserting mid-ambles in a first set of payloads of said plurality of payloads responsive to determinations that frequency channels for said first set of payloads are time-variant, wherein each mid-amble comprises a training symbol for channel estimation by a first set of STAs of said plurality of STAs;
    inserting no mid-amble in a second set of payloads of said plurality of payloads for a second set of STAs of said plurality of STAs responsive to determinations that frequency channels for said second set of payloads are non-time-variant, wherein said second set of STAs operate without mid-ambles;
    setting a preamble of the MU packet to indicate that mid-ambles are inserted on a per-user basis and that mid-ambles are used to transmit data to at least one STA of said plurality of STAs; and
  transmitting said MU packet to said first plurality of STAs in said downlink MU OFDMA transmission.

2. The method of claim 1, wherein said first set of payloads comprise mid-ambles of different mid-amble update intervals.

3. The method of claim 1, wherein said plurality of payloads comprises a downlink (DL) MU Multiple-input Multiple-output (MIMO) payload associated with a frequency channel and directed to multiple STAs of said plurality of STAs, wherein said generating further comprises determining not to insert mid-amble in said DL MU MIMO payload.

4. The method of claim 1, wherein said preamble comprises multiple user fields in a SIG-B field, and further comprising setting a first subfield in each of said multiple user fields to indicate existence of at least one mid-amble in a payload of said first set of payloads.

5. The method of claim 4, further comprising setting a second subfield in each of said multiple user fields to indicate a mid-amble update interval used in said payload, wherein a value of said second subfield indicates both a number of spatial streams and said mid-amble update interval.

6. The method of claim 1, wherein said preamble comprises a SIG-A field, and further comprising setting said Doppler subfield to indicate one of: a common mid-amble mode; and a per-user mid-amble mode of said MU packet.

7. The method of claim 1, further comprising:
  allocating a second set of frequency channels respectively to a second plurality of STAs for an uplink (UL) MU OFDMA transmission;
  generating a trigger frame comprising a first set of user information fields, wherein said generating comprises, for each of said first set of user information fields:
    setting a first indication for a corresponding STA to add one or more mid-ambles in a trigger-based (TB) MU packet for said uplink MU OFDMA transmission; and
    setting a second indication of mid-amble update interval for said TB MU packet, wherein mid-amble update intervals indicated in said first set of user information fields are different, and
  transmitting said trigger frame to said second plurality of STAs to initiate said UL MU OFDMA transmission, wherein said first set of user information fields comprises one or more user information fields.

8. The method of claim 7, wherein said trigger frame further comprises a second set of user information fields comprising one or more user information fields, and wherein said generating said trigger frame further comprises, for each of said second set of user information fields, setting an indication for a corresponding STA not to insert any mid-amble in a TB MU packet for said uplink MU OFDMA transmission.

9. The method of claim 7, wherein said trigger frame further comprises a common field comprising a subfield that specifies whether any mid-amble is to be inserted in a TB MU packet in said UL MU OFDMA transmission.

10. The method of claim 7, wherein said second indication is contained in a subfield additionally operable to indicate a spatial stream allocation.

11. A wireless communication device comprising:
  a memory;
  a processor coupled to said memory; and
  a transceiver comprising a signal processor, wherein said signal processor is configured to:
    at an access point, allocate a first set of frequency channels respectively to a first plurality of stations (STAs) for a downlink (DL) multi-user (MU) Orthogonal Frequency-Division Multiple Access (OFDMA) transmission;
    generate an MU packet comprising a plurality of payloads respectively to be transmitted in said first set of frequency channels, wherein to generate said MU packet comprises:
      inserting mid-ambles in a first set of payloads of said plurality of payloads responsive to determinations that frequency channels for said first set of payloads are time-variant, wherein each mid-amble comprises a training symbol for channel estimation by an STA of said plurality of STAs;

inserting no mid-amble in a second set of payloads of said plurality of payloads responsive to determinations that frequency channels for said second set of payloads are non-time-variant and operate without mid-ambles;

setting a preamble of the MU packet to indicate that mid-ambles are inserted on a per-user basis and that mid-ambles are used to transmit data to at least one STA of said plurality of STAs; and transmit said MU packet to said first plurality of STAs in said downlink MU OFDMA transmission.

12. The wireless communication device of claim 11, wherein said first set of payloads comprise mid-ambles of different mid-amble update intervals.

13. The wireless communication device of claim 11, wherein said plurality of payloads comprises an DL MU Multiple-input Multiple-output (MIMO) payload associated with a frequency channel and directed to multiple STAs of said plurality of STAs, wherein to generate said MU packet further comprises determining not to insert mid-amble in said DL MU MIMO payload.

14. The wireless communication device of claim 11, wherein said preamble comprises multiple user fields in a SIG-B field, and wherein to generated said MU packet further comprises setting a first subfield in each of said multiple user fields to indicate existence of at least one mid-amble in a payload of said first set of payloads.

15. The wireless communication device of claim 14, wherein to generate said MU packet further comprises setting a second subfield in each of said multiple user fields to indicate a mid-amble update interval used in said payload, wherein a value of said second subfield indicates both a number of spatial streams and said mid-amble update interval.

16. The wireless communication device of claim 11, wherein said preamble comprises a SIG-A field, and wherein to generate said MU packet further comprises setting a Doppler subfield in said SIG-A field to indicate a per-user mid-amble mode of said MU packet.

17. The wireless communication device of claim 11, wherein to generate said MU packet further comprises:

allocating a second set of frequency channels respectively to a second plurality OF STAs for an uplink (UL) MU OFDMA transmission;

generating a trigger frame comprising a first set of user information fields, wherein said generating comprises, for each of said first set of user information fields:

setting a first indication for a corresponding STA to add one or more mid-ambles in a trigger-based (TB) MU packet for said uplink MU OFDMA transmission; and setting a second indication of mid-amble update interval for said TB MU packet, wherein mid-amble update intervals indicated in said first set of user information fields are different, and transmitting said trigger frame to said second plurality of STAs to initiate said UL MU OFDMA transmission, wherein said first set of user information fields comprises one or more user information field.

18. The wireless communication device of claim 17, wherein said trigger frame further comprises a second set of user information fields comprising one or more user information fields, and wherein said generating said trigger frame further comprises, for each of said second set of user information fields, setting an indication for a corresponding STA not to insert any mid-amble in a TB MU packet for said uplink MU OFDMA transmission.

19. The wireless communication device of claim 17, wherein said trigger frame further comprises a common field comprising a subfield that specifies whether any mid-amble is to be inserted in a TB MU packet in said UL MU OFDMA transmission.

20. The wireless communication device of claim 17, wherein said second indication is contained in a subfield additionally operable to indicate a spatial stream allocation.

* * * * *